US010122593B2

(12) United States Patent
Vul et al.

(10) Patent No.: US 10,122,593 B2
(45) Date of Patent: Nov. 6, 2018

(54) METHOD AND SYSTEM FOR MANAGING COMPUTING RESOURCES USING AN ELECTRONIC LEASING AGENT

(75) Inventors: Alexander G. Vul, Palo Alto, CA (US); Mark Robert Henry Gray, Belfast (GB)

(73) Assignee: ORACLE AMERICA, INC., Redwood Shores, CA (US)

( * ) Notice: Subject to any disclaimer, the term of this patent is extended or adjusted under 35 U.S.C. 154(b) by 1330 days.

(21) Appl. No.: 11/708,304

(22) Filed: Feb. 20, 2007

(65) Prior Publication Data

US 2008/0201459 A1 Aug. 21, 2008

(51) Int. Cl.
*H04L 12/24* (2006.01)
*H04L 29/06* (2006.01)
*H04L 12/26* (2006.01)

(52) U.S. Cl.
CPC .......... *H04L 41/5009* (2013.01); *H04L 29/06* (2013.01); *H04L 41/0893* (2013.01); *H04L 41/147* (2013.01); *H04L 43/00* (2013.01)

(58) Field of Classification Search
CPC .................................. G06Q 10/00; G06F 9/50
USPC .................................................. 705/1; 711/10
See application file for complete search history.

(56) References Cited

U.S. PATENT DOCUMENTS

| 6,449,648 | B1 | 9/2002 | Waldo et al. |
| 6,499,049 | B2 | 12/2002 | Waldo et al. |
| 6,519,615 | B1 | 2/2003 | Wollrath et al. |
| 6,772,162 | B2 | 8/2004 | Waldo et al. |
| 6,950,874 | B2 | 9/2005 | Chang et al. |
| 2002/0009059 | A1* | 1/2002 | Abutaleb et al. ............. 370/318 |
| 2004/0067746 | A1* | 4/2004 | Johnson ....................... 455/405 |
| 2004/0205759 | A1* | 10/2004 | Oka ............................. 718/102 |
| 2007/0028244 | A1* | 2/2007 | Landis .................. G06F 9/5016 |
| | | | 718/108 |
| 2007/0260723 | A1* | 11/2007 | Cohen et al. ................. 709/223 |
| 2008/0086731 | A1* | 4/2008 | Trossman et al. ............ 718/100 |

OTHER PUBLICATIONS

U.S. Appl. No. 60/791,043.*
David Irwin, Jerey Chase, Laura Grit, Aydan Yumerefendi, David Becker, and Kenneth G. Yocum. Sharing networked resources with brokered leases. In USENIX Technical Conference, Jun. 2006.*

* cited by examiner

*Primary Examiner* — Maria C Santos-Diaz
(74) *Attorney, Agent, or Firm* — Fish IP Law, LLP

(57) ABSTRACT

A method for managing computing resources involves obtaining, by an electronic leasing agent, a request to lease access to one or more computing resources, and leasing, by the electronic leasing agent, access to the computing resource(s) based on the request.

12 Claims, 6 Drawing Sheets

METHOD AND SYSTEM FOR MANAGING COMPUTING RESOURCES USING AN ELECTRONIC LEASING AGENT

CROSS-REFERENCE TO RELATED APPLICATIONS

This application is related to copending U.S. patent application Ser. No. 11/708,367, filed on the same date as the present application and entitled "Method and System for Managing Computing Resources Using an Electronic Broker Agent," and copending U.S. patent application Ser. No. 11/708,305, filed on the same date as the present application and entitled "Method and System for Managing Computing Resources Using an Electronic Auction Agent," the entire contents of which are incorporated herein by reference. The referenced applications are in the names of the same inventors and co-owned by the same assignee as the present document.

BACKGROUND

In resource-intensive computing applications, a need for additional computing resources (e.g., processing capacity, networking capacity, storage capacity, etc.) may arise. Traditionally, when additional computing resources are required, computer hardware is purchased to satisfy the resource requirement. For example, a server system may be purchased to increase processing capacity, a network connection may be purchased to increase networking capacity, and/or a hard disk may be purchased to increase storage capacity.

Purchasing computer hardware to satisfy a resource requirement generally requires that the purchaser allocate physical space for the computer hardware. Further, purchasing computer hardware to satisfy a resource requirement may involve purchasing computer hardware that is not required. For example, a server system purchased to increase processing capacity typically includes a hard disk, random access memory (RAM), etc., which may not be required by the purchaser.

Modern trends in computer networking have resulted in the possibility of distributed resource pools, i.e., resource pools in which computing resources are distributed across computer systems in multiple locations (e.g., multiple offices, buildings, neighborhoods, cities, states, countries, etc.). Accordingly, it may be possible to obtain access to additional computing resources without purchasing computer hardware.

SUMMARY

In general, in one aspect, the invention relates to a method for managing computing resources. The method comprises obtaining, by an electronic leasing agent, a request to lease access to at least one computing resource, and leasing, by the electronic leasing agent, access to the at least one computing resource based on the request.

In general, in one aspect, the invention relates to a system. The system comprises a resource manager configured to monitor a resource pool, and determine whether the resource pool satisfies a threshold policy. The system further comprises an electronic leasing agent configured to obtain a request, when the resource pool satisfies the threshold policy, to lease access to at least one computing resource, and lease access to the at least one computing resource based on the request.

In general, in one aspect, the invention relates to a computer readable medium. The computer readable medium comprises executable instructions for managing computing resources by obtaining, by an electronic leasing agent, a request to lease access to at least one computing resource, and leasing, by the electronic leasing agent, access to the at least one computing resource based on the request.

Other aspects of the invention will be apparent from the following description and the appended claims.

DETAILED DESCRIPTION

Figure 1:
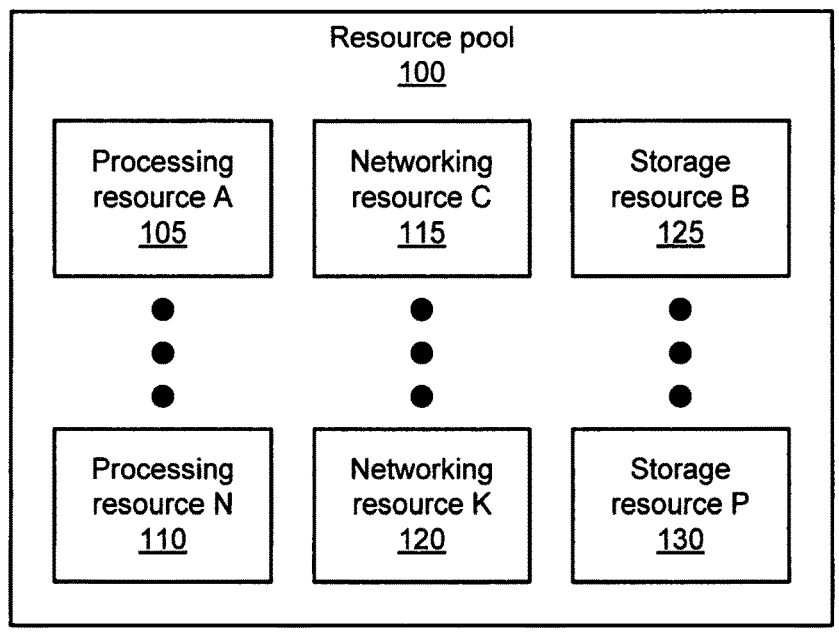
FIG. 1 shows a diagram of a resource pool in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to manage computing resources. An electronic leasing agent is configured to obtain a request to lease access to one or more computing resources. The electronic leasing agent is further configured to lease access to the one or more computing resources based on the request.

In one or more embodiments of the invention, the computing resource(s) to which access is leased may be associated with a resource pool. FIG. 1 shows a diagram of a resource pool (100) in accordance with one or more embodiments of the invention. Specifically, the resource pool (100) may include one or more processing resources (e.g., processing resource A (105), processing resource N (110)), one or more networking resources (e.g., networking resource C (115), networking resource K (120)), one or more storage resources (e.g., storage resource B (125), storage resource P (130)), any other similar type of computing resource (not shown), or any combination thereof.

In one or more embodiments of the invention, the processing resource(s) (e.g., 105, 110) may include processing capacity provided by any number of computer processors (e.g., single-core processors, dual-core processors, processors in a computer cluster, any other similar type of computer processor, or any combination thereof). In some cases, a processing resource (e.g., 105, 110) may include the full processing capacity of a computer processor. Alternatively, a processing resource (e.g., 105, 110) may include only a portion of the processing capacity of a computer processor. For example, only twenty percent of a particular computer processor's processing capacity may be allocated to the resource pool (100).

In one or more embodiments of the invention, the networking resource(s) (e.g., 115, 120) may include networking capacity provided by any number of networking devices (e.g., switches, routers, modems, repeaters, wireless network hubs, digital subscriber lines (DSL), T-carrier links, firewalls, any other similar type of networking device, or any combination thereof). In some cases, a networking resource (e.g., 115, 120) may include the full networking capacity of a networking device. Alternatively, a networking resource (e.g., 115, 120) may include only a portion of the networking capacity of a networking device. For example, only five percent of the bandwidth provided by a particular wireless networking hub may be allocated to the resource pool (100). As another example, only a subset of the ports available on a particular switch may be allocated to the resource pool (100).

In one or more embodiments of the invention, the storage resource(s) (e.g., 125, 130) may include storage capacity provided by any number of storage devices (e.g., hard disks, floppy disks, optical drives, flash memory drives, random access memory (RAM), any other similar type of storage device, or any combination thereof). In some cases, a storage resource (e.g., 125, 130) may include the full storage capacity of a storage device. Alternatively, a storage resource (e.g., 125, 130) may include only a portion of the storage capacity of a storage device. For example, only sixty percent of a particular hard disk's storage capacity may be allocated to the resource pool (100).

In one or more embodiments of the invention, one or more of the computing resources (e.g., 105, 110, 115, 120, 125, 130) in the resource pool (100) may be distributed across computer systems in multiple locations (e.g., multiple offices, buildings, neighborhoods, cities, states, countries, etc.). Specifically, access to one or more of the computing resources (e.g., 105, 110, 115, 120, 125, 130) may be provided by multiple business entities operating in different locations. For example, the resource pool (100) may be disposed within a computing grid, with portions of the computing grid provided by multiple business entities. In this context, a business entity is any entity buying and/or selling access to computing resources.

In one or more embodiments of the invention, one or more of the computing resources (e.g., 105, 110, 115, 120, 125, 130) may be virtual computing resources. Specifically, one or more of the computing resources (e.g., 105, 110, 115, 120, 125, 130) may provide a level of abstraction to underlying computing resources (not shown). For example, the underlying computing resources may be aggregated, spanned, concatenated, or otherwise combined to form one or more virtual computing resources. Alternatively, a single underlying computer resource may be partitioned into multiple virtual computing resources. Further, in one or more embodiments of the invention, one or more of the computing resources (e.g., 105, 110, 115, 120, 125, 130) may be hosted on a virtual machine, i.e., a virtual computer system consisting wholly of virtual computing resources.

More specifically, a resource pool (100) distributed across computer systems in multiple locations may be built using an ad-hoc network, dedicated network connections, any other similar type of network, or any combination thereof. In one or more embodiments of the invention, distributing the resource pool (100) across a network may allow for flexible management of the resource pool (100) with minimal hardware purchases.

Figure 2:
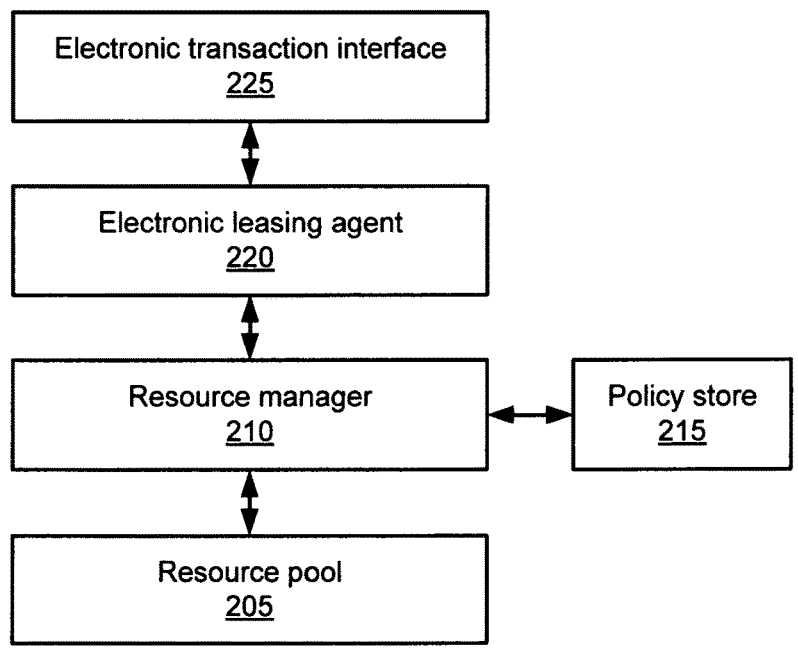
FIG. 2 shows a diagram of a system in accordance with one or more embodiments of the invention.

FIG. 2 shows a diagram of a system in accordance with one or more embodiments of the invention. Specifically, FIG. 2 shows a diagram of a system for managing computing resources in accordance with one or more embodiments of the invention.

In one or more embodiments of the invention, the system may include a resource pool (205) including any number of computing resources, as described above with respect to FIG. 1. Further, the system may include a resource manager (210) configured to manage the resource pool (205). Specifically, the resource manager (205) may be configured to manage allocation of computing resources in the resource pool (205) and/or monitor utilization of the computing resources in the resource pool (205). The resource manager (210) may be any type of hardware and/or software module configured to manage the resource pool (205). For example, the resource manager (210) may be part of an operating system, a file system, a circuit on a motherboard, any other similar type of hardware and/or software module, or any combination thereof.

In one or more embodiments of the invention, the resource manager (205) may be operatively connected to a policy store (215). Specifically, the policy store (215) may include one or more threshold policies defining conditions where access to additional computing resources should be purchased and/or where access to existing computing resources in the resource pool (205) should be sold. The policy store (215) may be any type of storage repository configured to store threshold policies. For example, the policy store (215) may include a configuration file, one or more database entries, an extensible markup language (XML) document, any other similar type of storage repository, or any combination thereof.

In one or more embodiments of the invention, a threshold policy may be based on a particular time or range of times. For example, access to additional computing resources may be purchased at regular intervals (e.g., every month, once a year, etc.). As another example, access to additional computing resources may be purchased during traditional shopping seasons (e.g., Christmas, Thanksgiving, etc.) when resource utilization may increase. As another example, additional computing resources may be purchased after a specified time period has elapsed since a most recent computing resource purchase (e.g., one week after the most recent computing resource purchase). Alternatively, any other type of time-based threshold policy, or any combination thereof, may be used.

In one or more embodiments of the invention, a threshold policy may be based on a current utilization level of computing resources in the resource pool (205). For example, access to additional storage capacity may be purchased when available storage capacity falls below a certain percentage of total storage capacity in the resource pool (205). As another example, surplus processing capacity may be sold when processing capacity utilization falls below a certain percentage of total processing capacity in the resource pool (205). Alternatively, any other type of utilization-based threshold policy, or any combination thereof, may be used.

In one or more embodiments of the invention, a threshold policy may be based on a predicted status of the resource pool (205). Specifically, the resource manager (210) may be configured to predict a future status of the resource pool (205) based on a resource utilization trend, and to compare the predicted status with a threshold policy. For example, a threshold policy may indicate that additional networking resources should be purchased if existing networking resources in the resource pool (205) are predicted to be fully utilized within three months. Alternatively, any other type of prediction-based threshold policy, or any combination thereof, may be used.

In one or more embodiments of the invention, a threshold policy may involve multiple types of computing resources. For example, a threshold policy may involve calculations to balance availability of processing capacity, networking capacity, storage capacity, etc. In one or more embodiments of the invention, using a threshold policy to balance availability of computing resources may guard against continuing to purchase access to one type of computing resource while access to another type of computing resource remains deficient.

The types of threshold policy described above are provided for exemplary purposes only, and should not be construed as limiting the scope of the invention. In one or more embodiments of the invention, any other type of threshold policy, or any combination thereof, may be used. For example, two or more types of threshold policy may be combined to form a more complex threshold policy. In one or more embodiments of the invention, the use of threshold policies may facilitate automated (i.e., with minimal user interaction) management of the resource pool (205).

Continuing with discussion of FIG. 2, in one or more embodiments of the invention, the resource manager (210) may be configured to generate a request, when a threshold policy is satisfied, to lease access to one or more computing resources. Specifically, the lease request may be a request to purchase access to one or more computing resources (i.e., under the terms of a lease), sell access to one or more computing resources (i.e., under the terms of a lease), or any combination thereof. Alternatively, another module (not shown) operatively connected to the resource manager (210) may be configured to generate the lease request. In one or more embodiments of the invention, the lease request may include metadata defining criteria for leasing access to the computing resource(s). Metadata is discussed below with respect to FIG. 3.

In one or more embodiments of the invention, the resource manager (210) (or another module configured to generate the lease request) may be configured to issue the lease request to an electronic leasing agent (220). Specifically, the electronic leasing agent (220) may be any type of hardware and/or software module configured to lease access to the computing resource(s) based on the request. In one or more embodiments of the invention, the electronic leasing agent (220) may be configured to handle only a single lease request. Accordingly, multiple lease requests may be handled by multiple electronic leasing agents (not shown). Alternatively, the electronic leasing agent (220) may be configured to handle multiple lease requests. For example, the electronic leasing agent (220) may be configured to handle all lease requests associated with a particular resource manager (e.g., 210), a particular resource pool (e.g., 205), and/or a particular type of computing resource.

In one or more embodiments of the invention, the electronic leasing agent (220) may be configured to lease access to the computing resource(s) using an electronic transaction interface (225). Specifically, the electronic transaction interface (225) may be any type of hardware and/or software interface providing access to computing resource offerings (i.e., offers for sale and/or purchase of access to computing resources). More specifically, one or more of the offers for sale and/or purchase may be associated with lease conditions (e.g., term of lease, cost per time unit, etc.).

In one or more embodiments of the invention, the electronic transaction interface (225) may be an interface to a commercial business portal, an online marketplace, or any other similar type of interface. More specifically, some or all of the computer resource offerings accessible via the electronic transaction interface (225) may be provided by multiple businesses operating in multiple locations. Further, in one or more embodiments of the invention, the computing resource offerings may be associated with one or more specific computing grids.

In one or more embodiments of the invention, the electronic leasing agent (220) may be configured to use multiple electronic transaction interfaces (not shown) to lease access to the computing resource(s). Using multiple electronic transaction interfaces may increase the likelihood of the electronic leasing agent (220) successfully leasing access to the computing resource(s). Further, using multiple electronic transaction interfaces may provide access to a larger number of computing resource offerings, thereby providing one or more benefits of marketplace competition (e.g., price wars, partnership incentives, etc.).

In one or more embodiments of the invention, using the electronic leasing agent (220) may facilitate management of the resource pool (205). For example, using the electronic leasing agent (220) may reduce the amount of user interaction required to manage the resource pool (205). Further, using the electronic leasing agent (220) may allow access to computing resources to be leased more quickly, particularly if the electronic transaction interface (225) is also highly automated.

Figure 3:
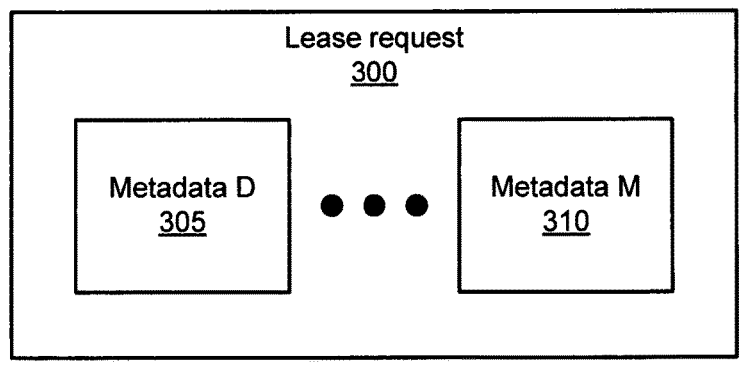
FIG. 3 shows a diagram of a lease request in accordance with one or more embodiments of the invention.

As discussed above, a lease request issued to an electronic leasing agent may include metadata defining criteria for leasing access to one or more computing resources. FIG. 3 shows a diagram of a lease request (300) in accordance with one or more embodiments of the invention. Specifically, FIG. 3 shows a diagram of a lease request (300) including one or more metadata components (e.g., metadata D (305), metadata M (310)) in accordance with one or more embodiments of the invention.

In one or more embodiments of the invention, the lease request (300) may be a remote procedure call, an extensible markup language (XML) document, a computer gateway interface (CGI) request, a hypertext transfer protocol (HTTP) POST, any other similar type of request, or any combination thereof. Accordingly, the metadata (e.g., 305, 310) may include one or more programming variables, XML tags, query string values, text values entered into a web page, any other similar type of metadata, or any combination thereof.

In one or more embodiments of the invention, the metadata (e.g., 305, 310) may indicate a type of computing resource (e.g., processing capacity, networking capacity, storage capacity, etc.) to which to lease access. Specifically, the metadata (e.g., 305, 310) may indicate a type of computing resource to which to purchase access and/or a type of computing resource to which to sell access (i.e., under the terms of a lease). In one or more embodiments of the invention, the metadata (e.g., 305, 310) may indicate multiple types of computing resources.

In one or more embodiments of the invention, the metadata (e.g., 305, 310) may indicate a quantity of computing resource(s) to which to lease access. For example, the metadata (e.g., 305, 310) may indicate that access to one hundred gigabytes of storage capacity should be purchased. As another example, the metadata (e.g., 305, 310) may indicate that access to one million processing cycles per second should be sold. Those skilled in the art will appreciate that many different quantifications of computing resources may be used.

In one or more embodiments of the invention, if the lease request (300) is to sell access to a computing resource, the metadata (e.g., 305, 310) may indicate a date when access to the computing resource is available. Alternatively, if the lease request (300) is to purchase access to the computing resource, the metadata (e.g., 305, 310) may indicate a date when access to the computing resource is needed.

In one or more embodiments of the invention, the metadata (e.g., 305, 310) may indicate a duration of access to a computing resource to lease. Said another way, the lease may only be for a limited period of time, in contrast to a perpetual lease. For example, access to additional processing capacity may only be required during a busy shopping season. Accordingly, the metadata (e.g., 305, 310) may indicate that access to processing capacity should only be purchased for the duration of the shopping season.

In one or more embodiments of the invention, if the lease request (300) is to sell access to a computing resource, the metadata (e.g., 305, 310) may indicate a minimum purchase price for the access. Alternatively, if the lease request (300) is to purchase access to a computing resource, the metadata (e.g., 305, 310) may indicate a maximum purchase price for the access. Further, the indicated price may be conditional, i.e., depending on other factors in the leasing transaction. For example, different minimum and/or maximum prices may be indicated for different quantities of access. Those skilled in the art will appreciate that many different minimum and/or maximum pricing schemes may be used.

As discussed above with respect to FIG. 2, the electronic leasing agent to which the lease request (300) is issued may be configured to use multiple electronic transaction interfaces. Accordingly, in one or more embodiments of the invention, the metadata (e.g., 305, 310) may indicate one or more specific electronic transaction interfaces to use. For example, a specific electronic transaction interface may specialize in specific types of transactions, may have a stronger reputation, may be less expensive to use, etc. Many different reasons for selecting a specific electronic transaction interface exist.

As discussed above with respect to FIG. 2, computing resource offers accessible via an electronic transaction interface may be provided by multiple businesses operating in multiple locations. Accordingly, in one or more embodiments of the invention, the metadata (e.g., 305, 310) may indicate one or more preferred transaction partners (i.e., one or more of the aforementioned businesses) to deal with when leasing access to a computing resource. For example, to ensure fast performance when accessing the computing resource(s), transaction partners in a particular geographic region may be preferred. As another example, one or more of the transaction partners may have a superior reputation, may offer lower prices, may provide transaction incentives, etc. Many different reasons for preferring a specific transaction partner exist.

In one or more embodiments of the invention, the electronic leasing agent to which the lease request (300) is issued may be configured to always operate for a predetermined length of time, or until access to a computing resource is successfully leased. Alternatively, the electronic leasing agent may be configured to operate for a duration of time specified in the lease request (300). Specifically, the metadata (e.g., 305, 310) may indicate a minimum and/or maximum duration for the electronic leasing agent to operate.

In some cases, it may not be possible for an electronic leasing agent to lease access to computing resource(s). For example, the electronic leasing agent may fail because no computing resource offers for the computing resource(s) exist, because an acceptable price is not found, because an electronic transaction interface may be temporarily inaccessible (e.g., due to a hardware failure, a software failure, network congestion, etc.), or for any other similar reason. Accordingly, in one or more embodiments of the invention, the metadata (e.g., 305, 310) may include one or more transaction failure escalation policies, i.e., courses of action to follow if an initial attempt to lease access to the computing resource(s) is not successful. For example, the transaction failure escalation policy may require that an alert message (e.g., email, text message, voicemail, or any other similar type of message) be sent to a system administrator. As another example, the transaction failure escalation policy may indicate an alternative electronic transaction interface to use. Many different types of transaction failure escalation policies, or any combination thereof, may be used.

In one or more embodiments of the invention, the use of metadata (e.g., 305, 310) in the lease request (300) may allow for a standardized interface for leasing access to computing resources. Specifically, a protocol between resource managers, electronic leasing agents, and/or electronic transaction interfaces may be defined based on a common format for the metadata (e.g., 305, 310).

Figure 4:
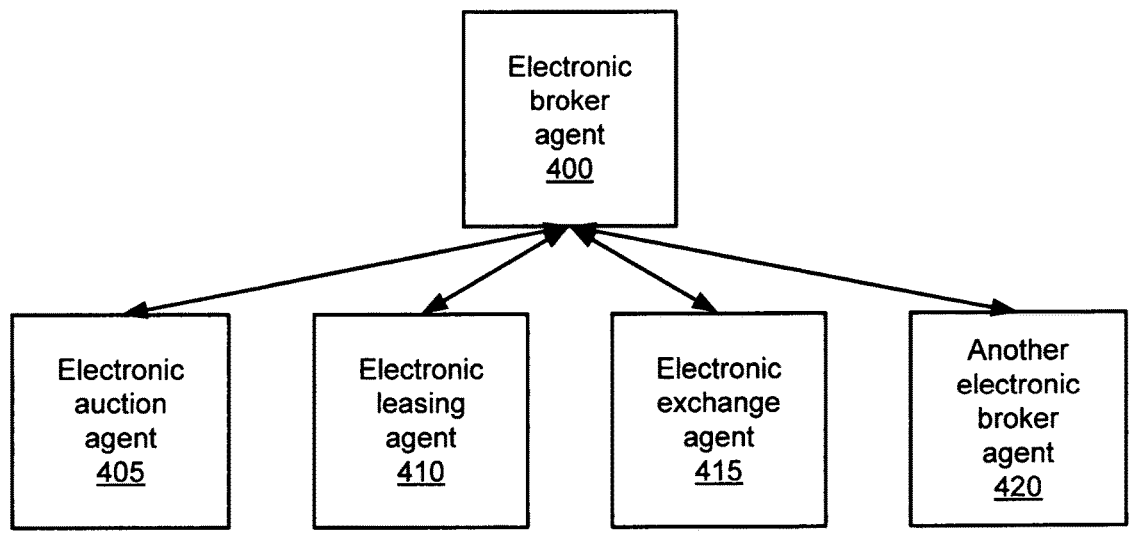
FIG. 4 shows a diagram of an electronic agent hierarchy in accordance with one or more embodiments of the invention.

In one or more embodiments of the invention, the electronic leasing agent may be under the control of an electronic broker agent. Specifically, an electronic broker agent may use the electronic leasing agent to purchase and/or sell access to computing resources. FIG. 4 shows a diagram of an electronic agent hierarchy in accordance with one or more embodiments of the invention. Specifically, as shown in FIG. 4, an electronic broker agent (400) may be configured to use an electronic auction agent (405), an electronic leasing agent (410), an electronic exchange agent (415), and/or another electronic broker agent (420) to sell and/or purchase access to one or more computing resources. Specifically, the electronic auction agent (405) may be used to sell and/or purchase access to the computing resource(s) via an electronic transaction interface, as discussed above, the electronic leasing agent (410) may be used to sell and/or purchase a lease of access to the computing resource(s), the electronic exchange agent (415) may be configured to arrange an exchange of access to the computing resource(s) for access to other computing resource(s), and the other electronic broker agent (420) may provide a second level of brokering services.

Further, in one or more embodiments of the invention, additional levels of electronic agent hierarchy not explicitly shown in FIG. 4 may exist. For example, the electronic exchange agent (415) may use an electronic auction agent to negotiate an exchange of computing resources. Many different electronic agent hierarchies may be used. Further discussion of electronic broker agents can be found in copending U.S. patent application Ser. No. 11/708,367, filed on the same date as the present document and entitled "Method and System for Managing Computing Resources Using an Electronic Broker Agent." Further discussion of electronic auction agents can be found in copending U.S. patent application Ser. No. 11/708,305, filed on the same date as the present document and entitled "Method and System for Managing Computing Resources Using an Electronic Auction Agent."

In one or more embodiments of the invention, the use of multiple electronic agents (e.g., 400, 405, 410, 415, 420) may increase the number of options available for buying and/or selling access to computing resources. For example, using an electronic leasing agent (405) may provide access to computing resource offerings that may not be available to other types of electronic agents. As another example, using an electronic exchange agent (415) may allow access to computing resources to be obtained without requiring a traditional monetary exchange. Further, the use of multiple electronic agents (e.g., 400, 405, 410, 415, 420) may increase the likelihood of successfully fulfilling the request.

Figure 5:
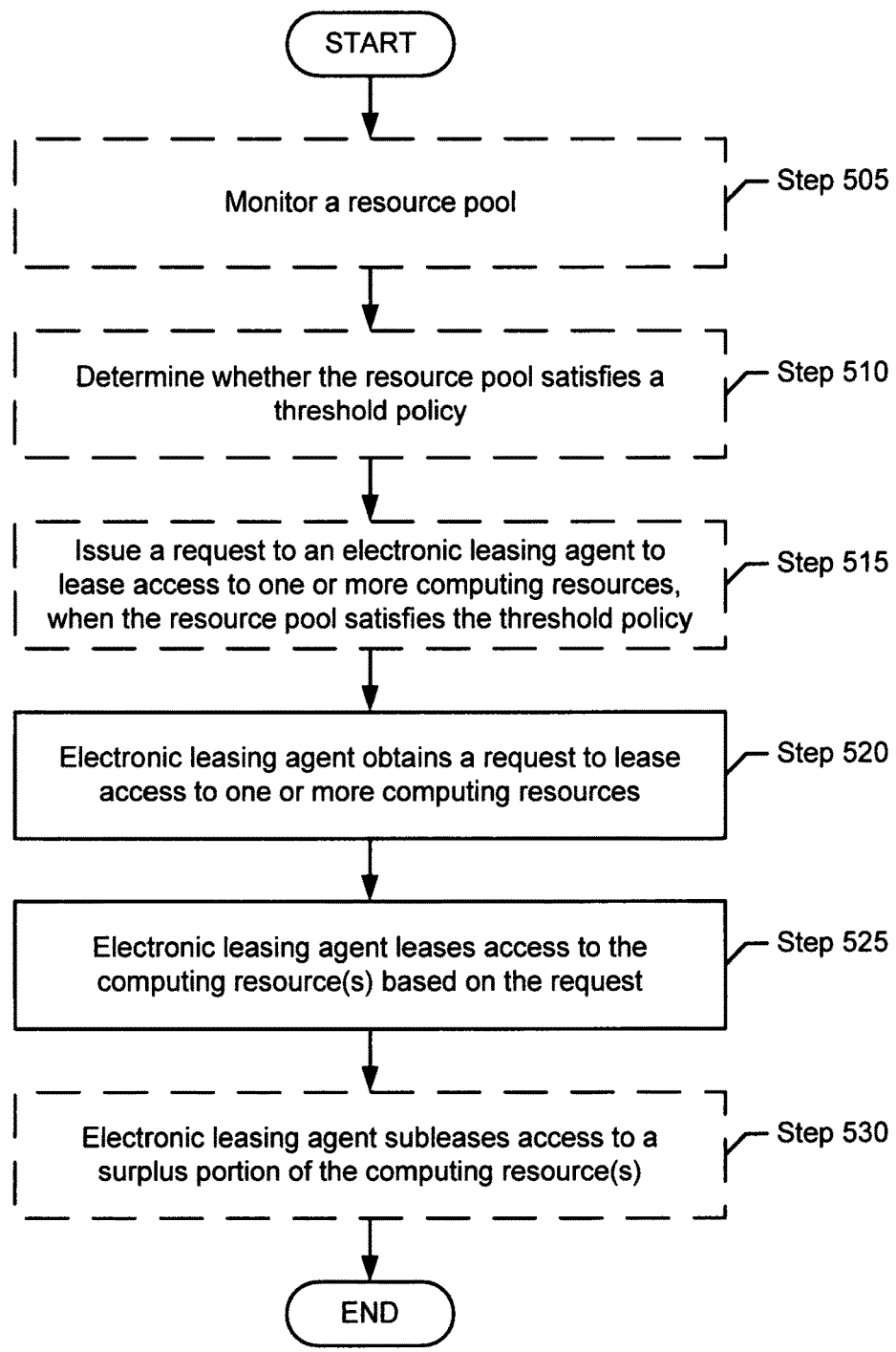
FIG. 5 shows a flowchart in accordance with one or more embodiments of the invention.

FIG. 5 shows a flowchart in accordance with one or more embodiments of the invention. Specifically, FIG. 5 shows a flowchart of a method for managing computing resources in accordance with one or more embodiments of the invention. In one or more embodiments of the invention, one or more of the steps described with respect to FIG. 5 may not be performed, may be performed in a different order, and/or may be repeated. Accordingly, the specific arrangement of steps shown in FIG. 5 should not be construed as limiting the scope of the invention in any way.

In one or more embodiments of the invention, in Step 505, a resource pool may be monitored. Specifically, the resource pool may be monitored to obtain metrics (e.g., minimum and/or maximum utilization level, utilization frequency, etc.) associated with one or more computing resources in the resource pool. Different types of computing resources are discussed above with respect to FIG. 1. For example, the resource pool may be monitored by a resource manager, as discussed above with respect to FIG. 2. Based on the monitoring, in Step 510, a determination may be made of whether the resource pool satisfies a threshold policy. Specifically, the threshold policy may indicate a condition in which access to one or more computing resources should be sold and/or purchased. Different types of threshold policy are discussed above with respect to FIG. 2.

In one or more embodiments of the invention, in Step 515, when the resource pool satisfies the threshold policy, a request to lease access to one or more computing resources may be issued to an electronic leasing agent. Alternatively, the request may not be based on any monitoring at all. For example, the request may be issued when the resource pool is first being created, or when a type of computing resource is needed that the resource pool presently lacks.

Regardless of the origin or basis for the request, in Step 520, an electronic leasing agent may obtain the request, and in Step 525, the electronic leasing agent may lease access to the computing resource(s) based on the request. Different types of requests to lease access to computing resource(s) are discussed above with respect to FIG. 3. In one or more embodiments of the invention, if the electronic leasing agent is not able to fulfill the request, the electronic leasing agent may issue a failure notice (not shown) to the requestor (e.g., the resource manager), in response to the request. Accordingly, the requestor may issue a second request providing alternative instructions (e.g., alternative metadata) for a second attempt to lease access to the computing resource(s). The electronic leasing agent and requestor may communicate back-and-forth in this manner until access to the computing resource(s) is successfully sold and/or purchased.

In one or more embodiments of the invention, to purchase access to computing resource(s), an electronic leasing agent may purchase access to a larger quantity of computing resource(s) than was initially requested. For example, the electronic leasing agent may purchase access to a larger quantity of computing resource(s) in order to obtain a volume pricing discount. Accordingly, in Step 530, the electronic leasing agent may sell access to (i.e., sublease) a surplus portion of the computing resource(s), i.e., a portion of the computing resource(s) that was not initially requested. In one or more embodiments of the invention, selling leasing out access to a surplus portion of the computing resource(s) may be performed automatically by the electronic leasing agent, or may be based on a second lease request issued after the initial lease request is fulfilled.

Figure 6A:
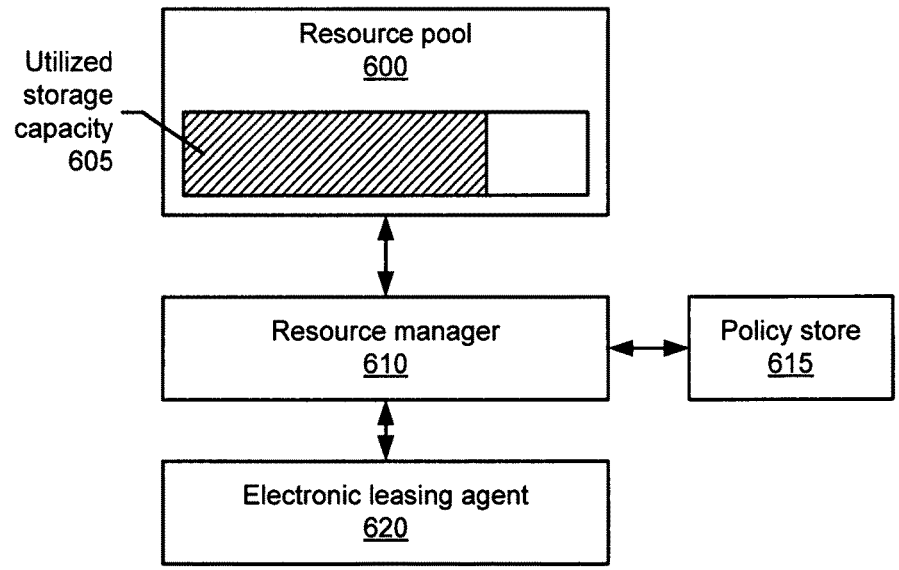
FIGS. 6A-6C show an example of managing computing resources in accordance with one or more embodiments of the invention.
Figure 6B:
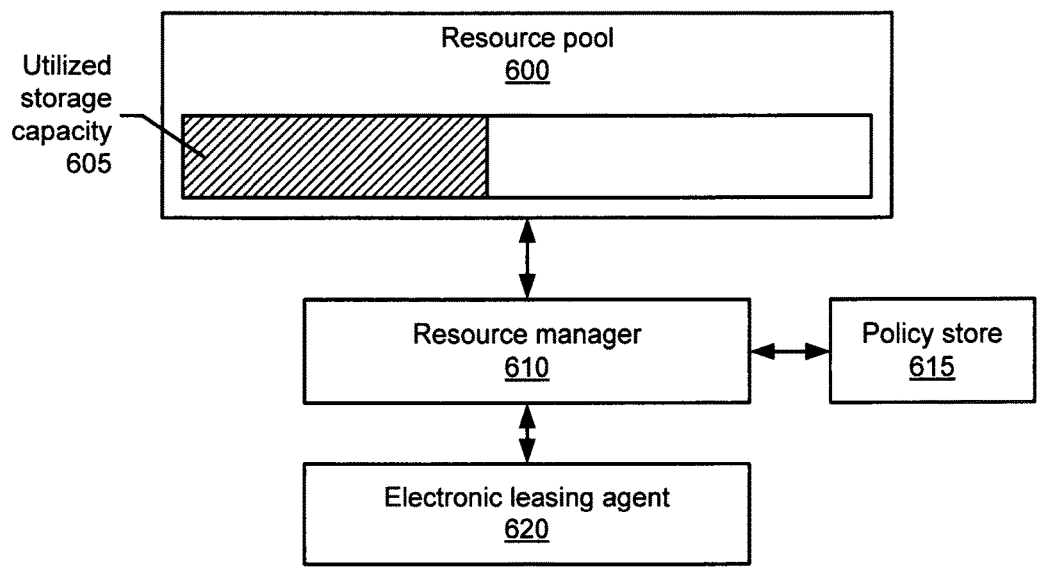
Figure 6C:
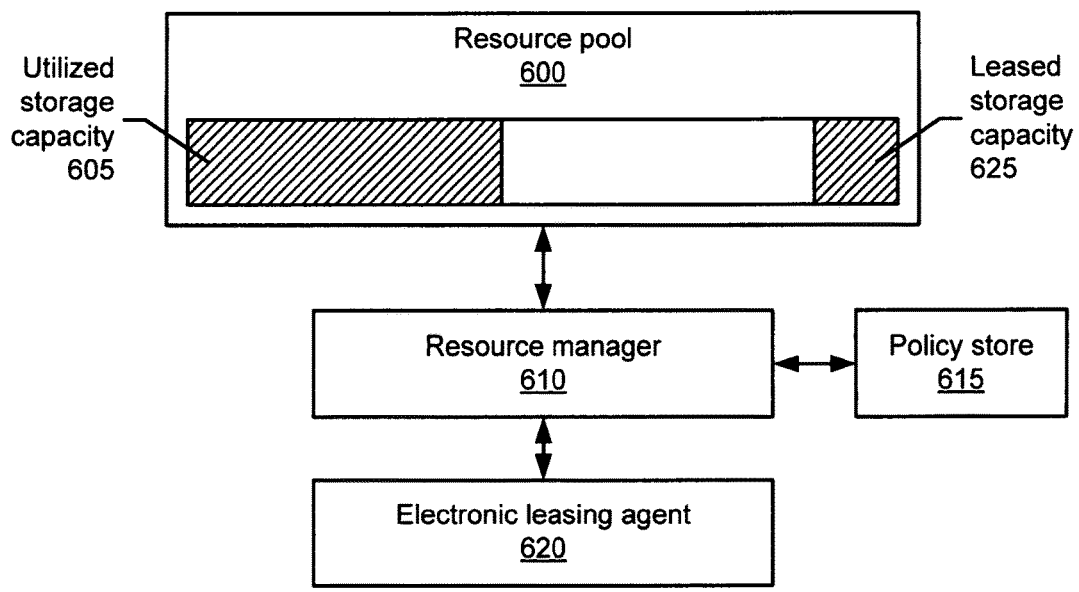

FIGS. 6A-6C show an example of managing computing resources in accordance with one or more embodiments of the invention. Those skilled in the art will appreciate that FIGS. 6A-6C are provided for exemplary purposes only. Accordingly, these figures, and any discussion thereof, should not be construed as limiting the scope of the invention in any way.

In the example shown in FIGS. 6A-6C, a resource pool (600) includes some amount of storage capacity. Initially, as shown in FIG. 6A, the utilized storage capacity (605) is seventy-five percent of the total storage capacity. A resource manager (610) monitors the resource pool (600) and compares utilization levels with threshold policies stored in a policy store (615). In this example, the policy store (615) includes a threshold policy indicating that access to additional storage capacity should be purchased when the utilized storage capacity (605) reaches seventy-five percent of total storage capacity. The threshold policy also indicates that access to enough additional storage capacity should be purchased so that the utilized storage capacity (605) is no more than fifty percent of the total storage capacity.

Because the threshold policy is satisfied (i.e., the utilized storage capacity (605) is at least seventy-five percent of the total storage capacity), the resource manager (610) generates a request to lease access to additional storage capacity. The resource manager (610) then issues the request to an electronic leasing agent (620). Based on the request, the electronic leasing agent (620) leases access to additional storage capacity, via an electronic transaction interface (not shown). Specifically, in this example, the electronic leasing agent (620) is configured to lease access to a sufficient quantity of additional storage capacity (i.e., enough so that the utilized storage capacity (605) is no more than fifty percent of the total storage capacity).

FIG. 6B shows the resource pool (600) after access to additional storage capacity has been leased and the additional storage capacity has been configured into the resource pool (600). As shown in FIG. 6B, the utilized storage capacity (605) is now less than fifty percent of the total storage capacity in the resource pool (600). In this example, the policy store (615) also includes a threshold policy indicating that the utilized storage capacity (605) should not be less than fifty percent of the total storage capacity. Specifically, the threshold policy indicates that access to surplus storage capacity should be sold when the utilized storage capacity (605) is less than fifty percent of the total storage capacity.

Because the utilized storage capacity (605) is now less than fifty percent of the total storage capacity, the electronic leasing agent (620) subleases the surplus storage capacity. Subleasing the surplus storage capacity may be based on the initial request (i.e., the initial request may include both a minimum and a maximum target for the utilized storage capacity (605)). Alternatively, the resource manager (610) may issue a new request to the electronic leasing agent (620) to sublease to the surplus storage capacity.

FIG. 6C shows the resource pool (600) after the surplus storage capacity has been subleased, as indicated by the leased storage capacity (625) shown in FIG. 6C. The utilized storage capacity (605) is now fifty percent of the storage capacity that remains available for use (i.e., the total storage capacity reduced by the subleased storage capacity (625)). Accordingly, no further selling and/or purchasing of access to storage capacity is required at this point.

One or more embodiments of the invention provide an efficient method for managing computing resources. Specifically, one or more embodiments of the invention allow access to computing resources to be efficiently bought and/or sold using an electronic leasing agent. For example, the use of an electronic leasing agent may reduce the amount of user interaction required to manage a resource pool.

Figure 7:
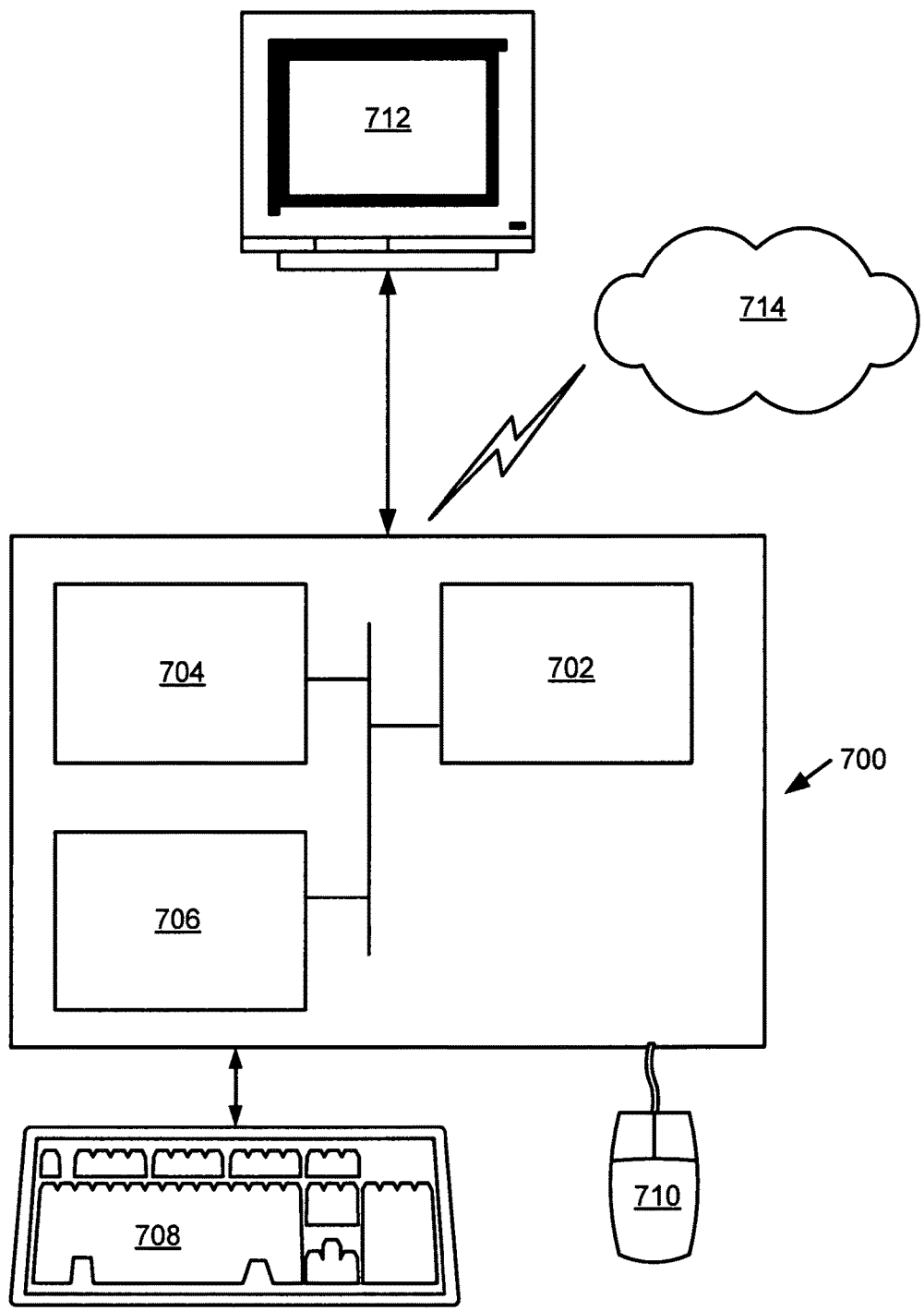
FIG. 7 shows a diagram of a computer system in accordance with one or more embodiments of the invention.

Embodiments of the invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) may be connected to a network (714) (e.g., a local area network (LAN), a wide area network (WAN) such as the Internet, or any other similar type of network) via a network interface connection (not shown). Those skilled in the art will appreciate that these input and output means may take other forms. Further, the computer system (700) may be a virtual machine and/or one or more components of the computer system (700) may be virtual computing resources.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., resource pool, processing resource, networking resource, storage resource, electronic transaction interface, electronic leasing agent, electronic auction agent, electronic broker agent, electronic exchange agent, policy store, resource manager, lease request, metadata, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a resource pool, comprising:
predicting, by a resource manager executing on at least one computer processor, a future status of the resource pool on a future date based on historical resource utilization trends, wherein the resource pool comprises:
a plurality of network-accessible computing resources distributed across computer systems connected via a network, wherein each of the plurality of computing resources is of a resource type among a plurality of types of computing resources comprising a processing resource type and a storage resource type, wherein at least one of the computing resources is a first virtualized combination of a plurality of physical computing resources of a first resource type from the plurality of types of computing resources;
determining that the future status on the future date fails to comply with a threshold policy;
generating, by the resource manager executing on the at least one computer processor, a first request to lease an additional hardware computing resource of the first resource type based on the future status failing to comply with the threshold policy, wherein the request comprises a duration of time for using the additional hardware computing resource, the future date when the additional hardware computing resource is required, and a plurality of electronic transaction interfaces to use;
obtaining, by the electronic leasing agent, the first request to lease access to the additional hardware computing resource,
selecting, by the electronic leasing agent, from a plurality of hardware computing resources, the additional hardware computing resource based on the additional hardware computing resource being available on the future date, available for the duration specified in the request and available via the plurality of electronic transaction interfaces;
leasing, by the electronic leasing agent, to the resource manager, access to the additional hardware computing resource on the future date, for the duration based on the request, and using the plurality of electronic transaction interfaces;
adding, by the resource manager executing on the at least one computer processor, the additional hardware computing resource to the first virtualized combination within the resource pool according to the access leased by combining the additional hardware computer resource with the plurality of the physical computing resources of the first resource type; and
allocating, by the resource manager, the first virtualized combination for utilization.

2. The method of claim 1, further comprising:
monitoring, by the resource manager, the resource pool.

3. The method of claim 1, wherein the first request further comprises at least one selected from a group consisting of a type of the additional hardware computing resource, a quantity of access to the additional hardware computing resource to lease, a minimum purchase price, a maximum purchase price, a preferred transaction partner, a minimum duration for the electronic leasing agent to operate, a maximum duration for the electronic leasing agent to operate, and a transaction failure escalation policy.

4. The method of claim 1, wherein the electronic leasing agent is under control of an electronic broker agent.

5. A system comprising:
at least one computer processor;
a resource manager executing on the at least one computer processor and configured to:
monitor a resource pool, wherein the resource pool comprises a plurality of network-accessible computing resources distributed across computer systems connected via a network, wherein each of the plurality of computing resources is of a resource type among a plurality of types of computing resources comprising a processing resource type and a storage resource type, wherein at least one of the computing resources is a first virtualized combination of a plurality of physical computing resources of a first resource type from the plurality of types of computing resources, predict a future status of the resource pool on a future date based on historical resource utilization trends, determine that the future status on the future date fails to comply with a threshold policy, generate a first request to lease an additional hardware computing resource of the first resource type based on the future status failing to comply with the threshold policy, wherein the request comprises a duration of time for using the additional hardware computing resource, the future date when the additional hardware computing resource is required, and a plurality of electronic transaction interfaces to use, add the additional hardware computing resource to the first virtualized combination within the resource pool according to a leased access by combining the additional hardware computing resource with the plurality of the physical computing resources of the first resource type, and allocate the first virtualized combination for utilization; and an electronic leasing agent executing on the at least one computer processor and configured to:

obtain the first request to lease access to the additional hardware computing resource, select, from a plurality of hardware computing resources, the additional hardware computing resource based on the additional hardware computing resource being available on the future date, available for the duration specified in the request, and available via the plurality of electronic transaction interfaces, lease, to the resource manager, access to the additional hardware computing resource on the future date, for the duration based on the request, and using the plurality of electronic transaction interfaces.

6. The system of claim 5, wherein the first request comprises at least one selected from a group consisting of a type of the additional hardware computing resource, a quantity of access to the additional hardware computing resource to lease, a minimum purchase price, a maximum purchase price, a preferred transaction partner, a minimum duration for the electronic leasing agent to operate, a maximum duration for the electronic leasing agent to operate, and a transaction failure escalation policy.

7. The system of claim 5, wherein the electronic leasing agent is under control of an electronic broker agent.

8. The system of claim 5, wherein the additional hardware computing resource is disposed within a utility computing grid.

9. At least one non-transitory computer readable medium comprising executable instructions, which, when executed by at least one computer processor, causes the at least one computer processor to execute the steps of:

predicting, by a resource manager, a future status of the resource pool on a future date based on historical resource utilization trends, wherein the resource pool comprises a plurality of network-accessible computing resources distributed across computer systems connected via a network, wherein each of the plurality of computing resources is of a resource type among a plurality of types of computing resources comprising a processing resource type and a storage resource type, wherein at least one of the computing resources is a first virtualized combination of a plurality of physical computing resources of a first resource type from the plurality of types of computing resources;

determining that the future status on the future date fails to comply with a threshold policy;

generating, by the resource manager, a request to lease an additional hardware computing resource of the first resource type based on the future status failing to comply with the threshold policy, wherein the request comprises a duration of time for using the additional hardware computing resource, the future date when the additional hardware computing resource is required, and a plurality of electronic transaction interfaces to use;

obtaining, by an electronic leasing agent, the request to lease access to the additional hardware computing resource;

selecting, by the electronic leasing agent, from a plurality of hardware computing resources, the additional hardware computing resource based on the additional hardware computing resource being available on the future date, available for the duration specified in the request, and available via the plurality of electronic transaction interfaces;

leasing, by the electronic leasing agent and to the resource manager, access to the additional hardware computing resource on the future date, for the duration based on the request, and using the plurality of electronic transaction interfaces; and adding, by the resource manager, the additional hardware computing resource to the first virtualized combination within the resource pool according to a leased access by combining the additional hardware computing resource with the plurality of the physical computing resources of the first resource type; and allocating, by the resource manager, the first virtualized combination for utilization.

10. The method of claim 1, further comprising:

determining, by the resource manager executing on the at least one computer processor, that the resource pool comprises a surplus after adding the additional hardware computing resource to the resource pool;

selecting, by the resource manager, a surplus portion of the resource pool based on determining that the resource pool comprises the surplus;

generating, by the resource manager executing on the at least one computer processor, a second request to sublease the surplus portion; and subleasing, by the electronic leasing agent, access to the surplus portion of the resource pool based on the second request.

11. The system of claim 5, wherein:

the resource manager is further configured to:

determine that the resource pool comprises a surplus after adding the additional hardware computing resource to the resource pool;

select a surplus portion of the resource pool based on determining that the resource pool comprises the surplus; and generate a second request to sublease the surplus portion; and the electronic leasing agent is further configured to:

sublease access to the surplus portion of the resource pool based on the second request.

12. The at least one non-transitory computer readable medium of claim 9, further comprising executable instructions which, when executed by the at least one computer processor, further cause the at least one computer processor to execute the steps of:
- determining, by the resource manager, that the resource pool comprises a surplus after adding the additional hardware computing resource to the resource pool;
- selecting, by the resource manager, a surplus portion of the resource pool based on determining that the resource pool comprises the surplus;
- generating, by the resource manager, a second request to sublease the surplus portion; and
- subleasing, by the electronic leasing agent, access to the surplus portion of the resource pool based on the second request.

* * * * *